United States Patent
Chen (10) Patent No.: US 10,931,885 B2
(45) Date of Patent: Feb. 23, 2021

(54) ILLUMINATION PROCESSING METHOD AND APPARATUS FOR ADJUSTING LIGHT TRANSMITTANCE

(71) Applicant: Huawei Technologies Co., Ltd., Shenzhen (CN)

(72) Inventor: Xiaoliang Chen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 16/185,791

(22) Filed: Nov. 9, 2018

(65) Prior Publication Data

US 2019/0082090 A1   Mar. 14, 2019

Related U.S. Application Data

(63) Continuation of application No. PCT/CN2017/071388, filed on Jan. 17, 2017.

(30) Foreign Application Priority Data

Aug. 29, 2016   (CN) .......................... 201610752836.6

(51) Int. Cl.
*H04N 5/235*   (2006.01)
*H04N 5/225*   (2006.01)
(Continued)

(52) U.S. Cl.
CPC ........... *H04N 5/2354* (2013.01); *H04N 5/217* (2013.01); *H04N 5/2254* (2013.01); *H04N 5/232* (2013.01);
(Continued)

(58) Field of Classification Search
CPC .... H04N 5/217; H04N 5/2254; H04N 5/2175; H04N 3/1568; H04N 5/359;
(Continued)

(56) References Cited

U.S. PATENT DOCUMENTS

| | | | |
|---|---|---|---|
| 2002/0012064 A1 | 1/2002 | Yamaguchi | |
| 2002/0047909 A1* | 4/2002 | Hatae | H04N 5/238 348/222.1 |

(Continued)

FOREIGN PATENT DOCUMENTS

| | | |
|---|---|---|
| CN | 202854468 U | 4/2013 |
| CN | 103149721 A | 6/2013 |

(Continued)

OTHER PUBLICATIONS

Machine Translation and Abstract of Japanese Publication No. JP2006245918, Sep. 14, 2006, 19 pages.

(Continued)

*Primary Examiner* — Sinh Tran
*Assistant Examiner* — Selam T Gebriel
(74) *Attorney, Agent, or Firm* — Maier & Maier, PLLC (57) ABSTRACT

An illumination processing method and apparatus relate to the field of video recording technologies, where a liquid crystal panel is disposed between a photosensitive sensor and a lens assembly, and an incident light from the lens assembly reaches the photosensitive sensor after passing through the liquid crystal panel. The method includes determining a highlight region on a first image captured from the photosensitive sensor, and turning down light transmittance of each pixel in an adjustment region on the liquid crystal panel, where the adjustment region corresponds to the highlight region. According to the illumination processing method and apparatus, occurrence of a highlight blooming phenomenon can be avoided as much as possible, thereby avoiding loss of valid image information.

18 Claims, 3 Drawing Sheets

(51) Int. Cl.
  *H04N 5/238* (2006.01)
  *H04N 5/232* (2006.01)
  *H04N 5/217* (2011.01)

(52) U.S. Cl.
  CPC ........... *H04N 5/238* (2013.01); *H04N 5/2351* (2013.01); *H04N 5/2353* (2013.01); *H04N 5/2355* (2013.01)

(58) Field of Classification Search
  CPC .. H04N 5/3591; H04N 5/3592; H04N 5/2352; H04N 5/2353; H04N 5/2354; H04N 5/2355; H04N 5/2356; H04N 5/2357; H04N 5/2358; H04N 5/238; H04N 5/235; H04N 5/2351
  See application file for complete search history.

(56) References Cited

U.S. PATENT DOCUMENTS

| | | | | |
|---|---|---|---|---|
| 2004/0239798 | A1* | 12/2004 | Nayar | H04N 5/2355 348/362 |
| 2006/0152649 | A1 | 7/2006 | Yanagida | |
| 2007/0206111 | A1* | 9/2007 | Iwane | H04N 5/238 348/342 |
| 2008/0007645 | A1 | 1/2008 | McCutchen | |
| 2013/0135543 | A1 | 5/2013 | Kaifu et al. | |
| 2013/0229566 | A1 | 9/2013 | Kaifu | |
| 2014/0247386 | A1* | 9/2014 | Takagi | G03B 7/00 348/362 |
| 2014/0375867 | A1* | 12/2014 | Kawahara | H04N 5/238 348/335 |
| 2015/0281547 | A1* | 10/2015 | Terasawa | H04N 5/2357 348/226.1 |
| 2016/0269603 | A1* | 9/2016 | Watanabe | H04N 5/2254 |
| 2017/0013182 | A1* | 1/2017 | Oshima | G03B 7/091 |
| 2017/0237885 | A1* | 8/2017 | Dhadwal | H04N 5/238 348/365 |

FOREIGN PATENT DOCUMENTS

| | | |
|---|---|---|
| CN | 103314326 A | 9/2013 |
| CN | 103780845 A | 5/2014 |
| JP | H09214827 A | 8/1997 |
| JP | 2006245918 A | 9/2006 |
| JP | 2009245462 A | 10/2009 |

OTHER PUBLICATIONS

Machine Translation and Abstract of Japanese Publication No. JPH09214827, Aug. 15, 1997, 19 pages.
Foreign Communication From a Counterpart Application, European Application No. 17844794.2, Extended European Search Report dated Nov. 28, 2018, 12 pages.
Machine Translation and Abstract of Chinese Publication No. CN103780845, May 7, 2014, 11 pages.
Machine Translation and Abstract of Chinese Publication No. CN202854468, Apr. 3, 2013, 9 pages.
Foreign Communication From a Counterpart Application, PCT Application No. PCT/CN2017/071388, English Translation of International Search Report dated Mar. 17, 2017, 2 pages.
Machine Translation and Abstract of Chinese Publication No. CN2009245462, Oct. 22, 2009, 22 pages.
Foreign Communication From a Counterpart Application, European Application No. 17844794.2, European Office Action dated Sep. 25, 2019, 5 pages.

\* cited by examiner

ILLUMINATION PROCESSING METHOD AND APPARATUS FOR ADJUSTING LIGHT TRANSMITTANCE

CROSS-REFERENCE TO RELATED APPLICATIONS

This application is a continuation of International Patent Application No. PCT/CN2017/071388 filed on Jan. 17, 2017, which claims priority to Chinese Patent Application No. 201610752836.6 filed on Aug. 29, 2016. The disclosures of the aforementioned applications are hereby incorporated by reference in their entireties.

TECHNICAL FIELD

The present disclosure relates to video recording technologies, and in particular, to an illumination processing method and apparatus.

BACKGROUND

As an important constituent of a security and protection system, the industry of video surveillance has gained rapid development in recent years. In various video surveillance systems, video cameras are widely used to capture images of target objects.

Currently, a basic structure of a video camera applied to various video surveillance systems includes a lens assembly including a lens, a photosensitive sensor located behind the lens assembly, and a processor configured to capture an image signal from the photosensitive sensor. The processor performs image processing on the image signal captured from the photosensitive sensor.

Figure 1:
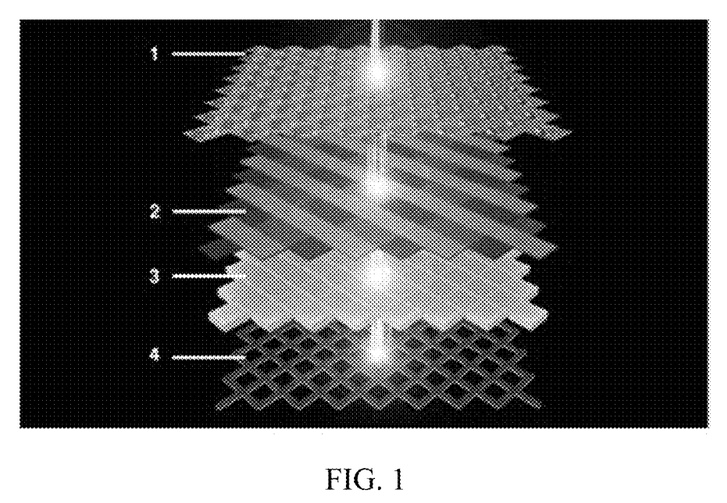
FIG. 1 is a schematic structural diagram of a photosensitive sensor.

FIG. 1 is a schematic structural diagram of a photosensitive sensor. The photosensitive sensor may be considered as an electronic film of a video camera. As shown in FIG. 1, a photosensitive surface of the photosensitive sensor is formed by an infinite quantity of small photosensitive units. Each photosensitive unit includes a microlens 1, a color filter 2, a photodiode 3, and a transmission circuit 4 that are disposed in sequence. In each photosensitive unit, the microlens 1 is configured to focus light, the color filter 2 is configured to allow an optical signal of a particular color to pass through, the photodiode 3 is configured to convert the optical signal passing through the color filter 2 into an electrical signal, and the transmission circuit 4 transmits the electrical signal output by the photodiode 3 to a processor.

In the photosensitive sensor shown in FIG. 1, for the photodiode 3, electrons in a p-n junction are excited by means of light in order to convert optical signal into electrical signal. If incident light on the photodiode 3 is excessively intense, a large quantity of electrons are excited in one photosensitive unit, and the large quantity of electrons excited in the photosensitive unit may "overflow" to other photosensitive units nearby. Consequently, other nearby photosensitive units are overexposed, that is, highlight blooming occurs in the nearby photosensitive units.

Occurrence of a highlight blooming phenomenon in an image captured by a video camera may cause loss of some important information of the image. For example, when an image of a vehicle is captured at night, a license plate number of the vehicle may not be clearly shown in the captured image due to highlight blooming of a vehicle lamp. In view of the interference caused by highlight blooming to obtaining of information of a target object, how to obtain as much valid image information as possible when the highlight blooming phenomenon occurs becomes an urgent problem to be solved in video recording technologies.

In other approaches, when the highlight blooming phenomenon occurs, a processing method used to obtain as much valid image information as possible includes when highlight blooming occurs in an image captured from a photosensitive sensor, a processor automatically sets a parameter (such as grayscale value) of a region whose brightness is greater than a specified threshold in the captured image to a relatively small value. For this method, since blooming already occurs in the image captured by the processor, some or all information of a region in which highlight blooming occurs is already lost. Therefore, even if the parameter of the related region on the captured image is set to a relatively small value, it is difficult to obtain valid information of the region in which highlight blooming occurs.

SUMMARY

An disclosure objective of the present disclosure is to provide an illumination processing method and apparatus in order to avoid occurrence of a highlight blooming phenomenon as much as possible using the method, thereby avoiding loss of valid image information.

According to a first aspect, an embodiment of the present disclosure provides an illumination processing method, including disposing a liquid crystal panel having adjustable light transmittance between a photosensitive sensor and a lens assembly, where an incident light from the lens assembly reaches the photosensitive sensor after passing through the liquid crystal panel, and the method includes determining a highlight region on a first image captured from the photosensitive sensor, and turning down light transmittance of each pixel in an adjustment region on the liquid crystal panel, wherein the adjustment region corresponds to the highlight region.

According to the illumination processing method in this embodiment of the present disclosure, because the liquid crystal panel having adjustable light transmittance is disposed between the photosensitive sensor and the lens assembly, when the highlight region exists on the first image captured from the photosensitive sensor, the light transmittance of each pixel in the region on the liquid crystal panel is decreased, wherein the region corresponds to the highlight region, to reduce incident light on the original highlight region in order to prevent occurrence of a highlight blooming phenomenon from a perspective of a light source, thereby avoiding, as much as possible, loss of information of the original region in which highlight blooming occurs.

In a possible design, before determining a highlight region on a first image captured from the photosensitive sensor, the method further includes setting light transmittance of each pixel on the liquid crystal panel to be a first value, where the first value falls within [A, B], A is a preset high threshold, and B is highest light transmittance of the liquid crystal panel, and capturing the first image from the photosensitive sensor.

In this implementation, the light transmittance of each pixel on the liquid crystal panel is set to the first value. On one hand, when no blooming phenomenon occurs, normal exposure of a video recording apparatus is ensured. On the other hand, when a blooming phenomenon occurs, a highlight region can be determined in time.

In a possible design, determining a highlight region on a first image captured from the photosensitive sensor includes determining the highlight region on the first image based on a grayscale value of each pixel in the first image.

In this implementation, because the highlight region on the first image is determined based on the grayscale value of each pixel in the first image, only a relatively small amount of computation is required such that processing efficiency of the method can be improved.

In a possible design, the first value is the highest light transmittance of the liquid crystal panel.

In this implementation, in a normal case, the light transmittance of each pixel on the liquid crystal panel is adjusted to the highest light transmittance of the liquid crystal panel. On one hand, normal exposure of a video recording apparatus is ensured. On the other hand, when a blooming phenomenon occurs, a highlight region can be determined in time.

In a possible design, the turning down light transmittance of each pixel in an adjustment region on the liquid crystal panel, wherein the adjustment region corresponds to the highlight region includes setting the light transmittance of each pixel in the adjustment region on the liquid crystal panel to be a second value, wherein the second value falls within [C, D], C is lowest light transmittance of the liquid crystal panel, and D is a preset low threshold, capturing a second image from the photosensitive sensor, determining, based on a grayscale value of each pixel in a region on the second image, wherein the region corresponds to the highlight region, target light transmittance to which the light transmittance of each pixel in the adjustment region on the liquid crystal panel is to be adjusted, and adjusting the light transmittance of each pixel in the adjustment region on the liquid crystal panel to the determined corresponding target light transmittance.

In a possible design, the second value is the lowest light transmittance of the liquid crystal panel.

In a possible design, determining, based on a grayscale value of each pixel in a region on the second image, wherein the region corresponds to the highlight region, target light transmittance to which the light transmittance of each pixel in the adjustment region on the liquid crystal panel is to be adjusted includes determining a relationship between light transmittance and an image grayscale value based on the grayscale value of each pixel in the region on the second image, wherein the region corresponds to the highlight region, and determining, based on the relationship between the light transmittance and the image grayscale value, the target transmittance of each pixel point in the adjustment region on the liquid crystal panel when the grayscale value of each pixel in a region on an image captured from the photosensitive sensor, wherein the region corresponds to the highlight region, reaches a preset expected grayscale value.

In a possible design, determining a relationship between light transmittance and an image grayscale value based on the grayscale value of each pixel in the region on the second image, wherein the region corresponds to the highlight region includes predetermining an association relationship between light energy reaching the photosensitive sensor and an image grayscale value, where the association relationship satisfies a formula $y=f(x)$, y is the image grayscale value, x is the light energy, $f(x)$ is an increasing function, $x=dz$, z is light transmittance, and d is a to-be-determined parameter, calculating an inverse function of the function $f(x)$, to obtain a function relationship $dz=f^{-1}(y)$ between the light transmittance and the image grayscale value, and determining the to-be-determined parameter d in the function relationship between the light transmittance and the image grayscale based on the grayscale value of each pixel in the region on the second image, wherein the region corresponds to the highlight region.

In a possible design, the method further includes predicting a predicted highlight region on a subsequent image after the first image, wherein the predicted highlight region corresponds to the highlight region, and turning down light transmittance of each pixel in a region on the liquid crystal panel, wherein the region corresponds to the predicted highlight region before the subsequent image corresponding to the predicted highlight region is captured from the photosensitive sensor.

In this implementation, a highlight moving target can be tracked, and light transmittance of a position corresponding to a moving highlight region can be adjusted in advance.

According to a second aspect, to implement the illumination processing method according to the first aspect, an illumination processing apparatus is provided. The apparatus has a function of implementing the foregoing illumination processing method. The function may be implemented using hardware, or may be implemented using hardware to execute corresponding software. The hardware or software includes one or more modules corresponding to the foregoing function.

In a possible design, the apparatus includes a plurality of functional units configured to implement any illumination processing method according to the first aspect. According to the illumination processing apparatus of this embodiment of the present disclosure, a liquid crystal panel having adjustable light transmittance is disposed between a photosensitive sensor and a lens assembly such that when a highlight region exists on a captured first image, light transmittance of each pixel in a region on the liquid crystal panel is turned down, wherein the region corresponds to the highlight region, to reduce incident light on the original highlight region in order to prevent occurrence of a highlight blooming phenomenon when obtaining images, thereby avoiding, as much as possible, loss of information of the original region in which highlight blooming occurs.

In a possible design, the apparatus is used as a processor and is connected to the liquid crystal panel having adjustable light transmittance, the liquid crystal panel is disposed between the lens assembly and the photosensitive sensor, and an incident light from the lens assembly reaches the photosensitive sensor after passing through the liquid crystal panel. The apparatus includes a highlight region determining unit configured to determine a highlight region on a first image captured from the photosensitive sensor, and a light transmittance adjustment unit configured to decrease light transmittance of each pixel in an adjustment region on the liquid crystal panel, wherein the adjustment region corresponds to the highlight region.

According to a third aspect, a video recording apparatus is provided, including a lens assembly, a photosensitive sensor, a liquid crystal panel having adjustable light transmittance, and a processor configured to perform the foregoing illumination processing method.

The liquid crystal panel is disposed between the lens assembly and the photosensitive sensor, and is connected to the processor, and an incident light from the lens assembly reaches the photosensitive sensor after passing through the liquid crystal panel.

In a possible design, the liquid crystal panel covers and is adhered to a photosensitive surface of the photosensitive sensor.

According to a fourth aspect, an embodiment of the present disclosure provides a computer storage medium configured to store a computer software instruction for use by the foregoing illumination processing apparatus, where the computer software instruction includes a program designed for performing the foregoing aspects.

According to the illumination processing method and apparatus provided in the embodiments of the present disclosure, occurrence of a highlight blooming phenomenon can be avoided as much as possible, thereby avoiding loss of valid image information.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

A video recording apparatus described in embodiments of the present disclosure is intended to describe technical solutions of the embodiments of the present disclosure more clearly, and does not constitute a limitation to the technical solutions provided in the embodiments of the present disclosure. A person skilled in the art should understand that, with evolution of video recording technologies and emergence of new service scenarios, the technical solutions provided in the embodiments of the present disclosure are also applicable to similar technical problems.

Figure 2:
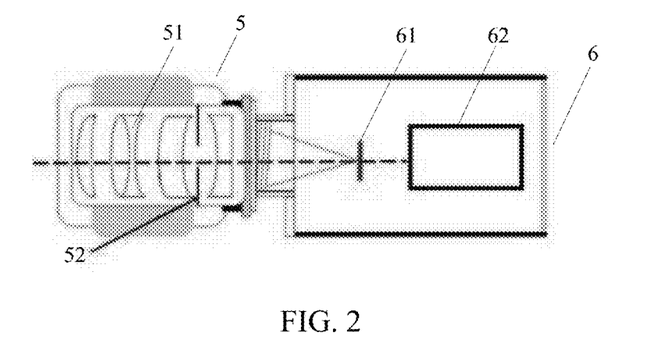
FIG. 2 is a schematic structural diagram of a video recording apparatus according to an embodiment of the present disclosure.

FIG. 2 is a schematic structural diagram of a video recording apparatus according to an embodiment of the present disclosure. As shown in FIG. 2, the video recording apparatus includes a lens assembly unit 5 and a processing unit 6. The lens assembly unit 5 includes a battery of lens 51 and an aperture 52. The processing unit 6 includes a photosensitive sensor 61 and a processor 62. Different from a video recording apparatus in the other approaches, in the video recording apparatus shown in FIG. 2, the processing unit 6 further includes a liquid crystal panel having adjustable light transmittance (not shown in FIG. 2 and also directly referred to as a liquid crystal panel in other parts of this specification). A position at which the liquid crystal panel having adjustable light transmittance is disposed may be set as required. The position at which the liquid crystal panel is disposed satisfies that an incident light from the battery of lens 51 of the lens assembly 5 needs to pass through the liquid crystal panel before reaching the photosensitive sensor 61, and a control circuit of the liquid crystal panel is connected to the processor 62. Optionally, the liquid crystal panel having adjustable light transmittance covers and is adhered to a photosensitive surface of the photosensitive sensor 61.

Figure 3:
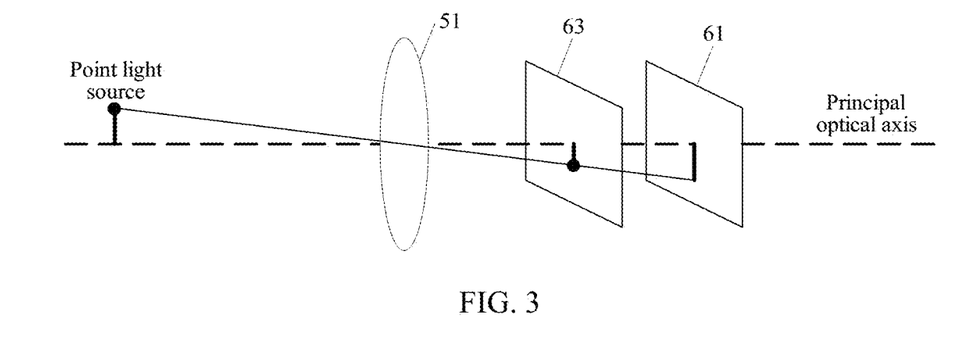
FIG. 3 is a simplified schematic structural diagram of a video recording apparatus including a liquid crystal panel according to an embodiment of the present disclosure.

FIG. 3 is a simplified schematic structural diagram of a video recording apparatus including a liquid crystal panel according to an embodiment of the present disclosure. In the video recording apparatus, the liquid crystal panel 63 covers the photosensitive surface of the photosensitive sensor 61, and the liquid crystal panel 63 is adhered to the photosensitive surface of the photosensitive sensor 61. For ease of description, in FIG. 3, a distance is drawn between the liquid crystal panel 63 and the photosensitive sensor 61. It can be directly seen from FIG. 3 that, an incident light passes through a lens 51 of the lens assembly and the liquid crystal panel 63, and then is irradiated on the photosensitive sensor 61.

The video recording apparatus shown in FIG. 2 and FIG. 3 is configured to perform an illumination processing method according to an embodiment of the present disclosure. According to the illumination processing apparatus of the embodiments of the present disclosure, because the liquid crystal panel 63 having adjustable light transmittance is disposed between the photosensitive sensor 61 and the lens assembly, the processor 62 can control the light ray illuminating on the photosensitive sensor 61 by setting light transmittance of the liquid crystal panel 63. Based on this, when determining that a highlight region exists on a captured image, the processor 62 decreases light transmittance of each pixel in a region on the liquid crystal panel 63 corresponding to the highlight region to reduce the incident light on the original highlight region in order to prevent occurrence of a highlight blooming phenomenon when obtaining images, thereby avoiding, as much as possible, loss of information of the original highlight blooming region.

The following describes in detail the illumination processing method of this embodiment of the present disclosure with reference to the accompanying drawings.

Figure 4:
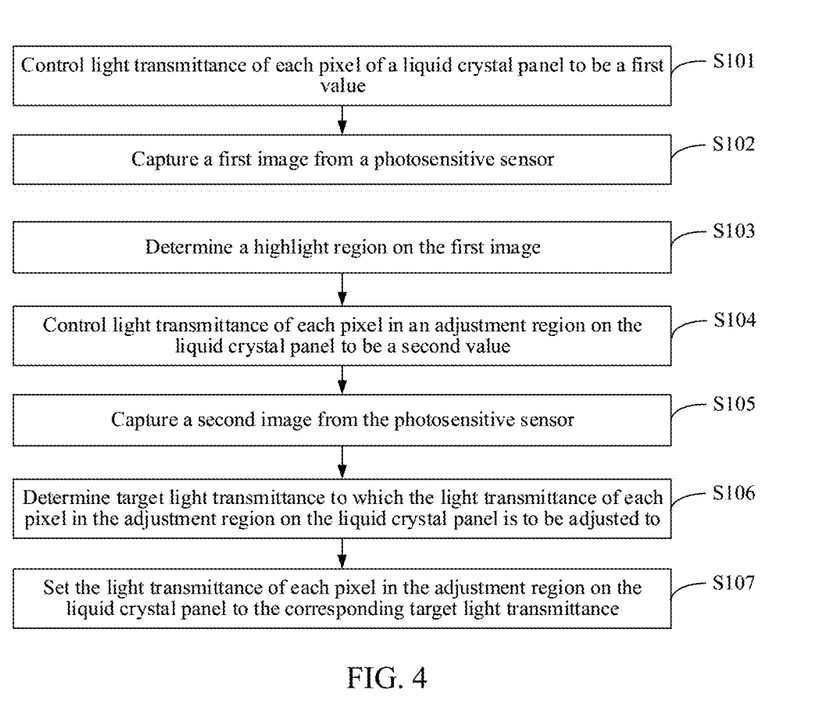
FIG. 4 is a flowchart of an illumination processing method according to an embodiment of the present disclosure.

FIG. 4 is a flowchart of an illumination processing method according to an embodiment of the present disclosure. The method shown in FIG. 4 is based on the video recording apparatus shown in FIG. 2 and FIG. 3. The method shown in FIG. 4 includes the following steps.

Step S101: The processor controls light transmittance of each pixel on the liquid crystal panel to be a first value.

In a normal state, that is, when no highlight blooming phenomenon occurs, the processor controls the light transmittance of each pixel on the liquid crystal panel to be the first value.

The first value is a relatively large value within an adjustable range of the light transmittance of the liquid crystal panel. For example, the first value falls within [A, B], where A is a preset high threshold, and B is the highest light transmittance of the liquid crystal panel. For example, if the adjustable range of the light transmittance of the liquid crystal panel is [0.2, 0.9], the first value may fall within [0.7, 0.9], and 0.7 is the preset high threshold.

When no highlight blooming phenomenon occurs in a captured image, the processor sets the light transmittance of the liquid crystal panel to a relatively large value. On one hand, definition of the captured image can be ensured. On the other hand, when highlight blooming occurs, a region in which highlight blooming occurs can be determined as quickly as possible.

Optionally, the first value is the highest light transmittance of the liquid crystal panel. For example, based on the foregoing example, the first value is 0.9.

Step S102: The processor captures a first image from the photosensitive sensor.

When the video recording apparatus shown in FIG. 2 and FIG. 3 runs normally, the processor captures an image from the photosensitive sensor according to a rule. For example, the processor captures an image form the photosensitive sensor at a time interval, or the processor captures an image from the photosensitive sensor each time a shutter is triggered.

Step S103: The processor determines a highlight region on the first image.

After capturing the first image from the photosensitive sensor, the processor determines whether a highlight region exists on the first image. A manner in which the processor determines whether a highlight region exists on the first image includes determining, by the processor based on a grayscale value of each pixel in the first image, whether a highlight region exists on the first image.

Optionally, the processor uses an 8-bit binary unsigned integer to represent the grayscale value of each pixel in the first image. That is, a value range of the grayscale value is 0 to 255, where 0 represents pure black, 255 represents pure white, and intermediate values represent different degrees of gray. A larger grayscale value indicates a brighter pixel, and on the contrary, a smaller grayscale value indicates a darker pixel.

The highlight region is literally a region having a relatively high brightness. In this embodiment of the present disclosure, the processor may determine a pixel having a grayscale value greater than or equal to a first threshold as a highlight pixel. A relatively large quantity of highlight pixels forms a highlight region.

Optionally, the first threshold may be set according to an actual requirement. For example, the first threshold may be set to 240, that is, the processor determines a pixel having a grayscale value greater than or equal to 240 as a highlight pixel.

It should be noted that, if no highlight region exists on the first image captured by the processor from the photosensitive sensor, the processor processes the image according to the other approaches, or if a highlight region exists on the first image captured by the processor from the photosensitive sensor, the processor performs processing according to the following steps of the method of this embodiment.

Step S104: The processor controls light transmittance of each pixel in a region on the liquid crystal panel to be a second value. The region corresponds to the highlight region.

After determining the highlight region on the first image, the processor further determines the region on the liquid crystal panel and corresponding to the highlight region. For ease of description below, the region on the liquid crystal panel and corresponding to the highlight region is referred to as an adjustment region.

In the video recording apparatus shown in FIG. 2 and FIG. 3, although the liquid crystal panel is adhered to the photosensitive sensor, there is still some distance between the liquid crystal panel and the photosensitive sensor. In addition, because of impact of factors such as installation error and light projection manner, the foregoing highlight region cannot be simply determined as the adjustment region whose light transmittance needs to be adjusted on the liquid crystal panel.

Optionally, the foregoing adjustment region may be considered as a region obtained after perspective transformation is performed on the highlight region. In a fixed video recording apparatus, a perspective transformation relationship between the adjustment region and the highlight region is usually fixed. Therefore, after determining the highlight region, the processor obtains the adjustment region on the liquid crystal panel by performing perspective transformation on the highlight region. Optionally, the perspective transformation relationship between the adjustment region and the highlight region may be prestored in the video recording apparatus.

Optionally, the perspective transformation relationship between the adjustment region and the highlight region may be determined using a perspective transformation matrix. In a possible manner of determining a perspective matrix, the perspective transformation matrix is a 3×3 matrix, and specific steps of determining the perspective transformation matrix include aligning the video recording apparatus shown in FIG. 2 or FIG. 3 with a white wall, sending, by the processor, an instruction to the liquid crystal panel, where the instruction sets light transmittance of four pixels on the liquid crystal panel to be a minimum value of the light transmittance of the liquid crystal panel, and any three of the four pixels are not collinear, capturing, by the processor, an image formed on the photosensitive sensor, where there are four black points in the captured image, and performing, by the processor, relationship conversion based on coordinates of the four pixels on the liquid crystal panel and coordinates of the four black points in the captured image to obtain the perspective transformation matrix for conversion between the highlight region and the adjustment region.

After determining the adjustment region on the liquid crystal panel, the processor sets the light transmittance of each pixel in the adjustment region to the second value.

The second value is a relatively small value within the adjustable range of the light transmittance of the liquid crystal panel. For example, the second value falls within [C, D], where C is the lowest light transmittance of the liquid crystal panel, and D is a preset low threshold. In a specific example, the adjustable range of the light transmittance of the liquid crystal panel is [0.2, 0.9], a value range of the second value may be [0.2, 0.3], and 0.3 is the preset low threshold. Herein, the preset low threshold needs to be set to lower than the preset high threshold.

Optionally, the processor sets the light transmittance of each pixel in the adjustment region to the lowest light transmittance, for example, 0.2 in the foregoing example.

In another possible implementation, after determining the adjustment region on the liquid crystal panel, the processor sets light transmittance of all pixels on the entire liquid crystal panel to the second value.

Step S105: The processor captures a second image from the photosensitive sensor.

Step S106: The processor determines, based on a grayscale value of each pixel in a region on the second image and the region corresponding to the highlight region, target light transmittance which the light transmittance of each pixel in the adjustment region on the liquid crystal panel is to be adjusted to.

Step S107: The processor sets the light transmittance of each pixel in the adjustment region on the liquid crystal panel to the corresponding target light transmittance.

In this step, if the processor sets only the light transmittance of each pixel in the adjustment region on the liquid crystal panel to the second value and keeps light transmittance of each pixel in all other regions as the first value after determining the adjustment region on the liquid crystal panel, the processor only decreases the light transmittance of each pixel in the adjustment region according to step S107.

In another possible implementation, after determining the adjustment region on the liquid crystal panel, the processor sets the light transmittance of each pixel on the entire liquid crystal panel to the second value. Then, after step S107, the processor further sets light transmittance of each pixel in all other regions than the adjustment region on the liquid crystal panel to the first value, for example, to the highest light transmittance of the liquid crystal panel.

It should be noted that, pixels in the highlight region on the first image include directly illuminated points and highlight blooming points. A directly illuminated point is a highlight pixel formed by excessively intense light reaching a photosensitive unit. A highlight blooming point is a highlight pixel formed by electrons overflowing from the photosensitive unit of directly illuminated point.

Based on this, the target light transmittance of each pixel in the adjustment region determined by the processor is usually lower than the first value. However, when the first value is lower than the highest light transmittance of the liquid crystal panel, there may be a special case in which light transmittance of a pixel corresponding to a highlight blooming point is higher than the first value.

It should be noted that the target light transmittance to which each pixel in the adjustment region is to be adjusted is usually lower than the foregoing the first value.

In the solution of this embodiment of the present disclosure, after adjusting the light transmittance of each pixel in the adjustment region on the liquid crystal panel to the second value, the processor continues to capture an image (the second image) from the photosensitive sensor. The processor determines, based on the grayscale value of each pixel in the region on the second image and the region corresponds to the highlight region, the target light transmittance to which the light transmittance of each pixel in the adjustment region on the liquid crystal panel needs to be adjusted. The processor may determine, in a plurality of manners, the target light transmittance to which the light transmittance of each pixel in the adjustment region on the liquid crystal panel needs to be adjusted.

A feasible method for implementing step S106 includes the following steps.

Step S111: The processor determines, by comparing a grayscale value of each pixel in the region on the second image and the region corresponding to the highlight region with that of a corresponding pixel in the first image, a grayscale value variation of each pixel.

Step S112: The processor determines a directly illuminated point and a highlight blooming point in the highlight region based on the grayscale value variation of each pixel in the region on the second image and the region corresponding to the highlight region.

For example, the processor determines a pixel having a grayscale value variation greater than a fixed value as a highlight blooming point, and determines a pixel having a grayscale value variation not greater than the fixed value as a directly illuminated point.

Step S113: The processor increases the light transmittance of pixel on the liquid crystal panel and the pixel corresponding to the highlight blooming point, and light transmittance of a pixel on the liquid crystal panel and the pixel corresponding to the directly illuminated point may be kept at the second value.

Another feasible method for implementing step S106 includes the following steps.

Step S121: The processor determines a relationship between light transmittance and an image grayscale value based on the grayscale value of each pixel in the region on the second image and the region corresponding to the highlight region.

Step S122: The processor sets an expected grayscale value that each pixel in a region on an image captured from the photosensitive sensor and the region corresponding to the highlight region needs to reach. The processor determines, based on the relationship between the light transmittance and the image grayscale value, the target light transmittance of each pixel in the adjustment region on the liquid crystal panel when a grayscale value of each pixel in the region on the image captured from the photosensitive sensor and the region corresponding to the highlight region reaches the preset expected grayscale value.

In the foregoing step S121, a manner in which the processor determines a relationship between the light transmittance of the liquid crystal panel and a grayscale value of a captured image includes the following.

(1) The processor predetermines an association relationship between light energy reaching the photosensitive sensor and an image grayscale value. The association relationship satisfies a formula $y=f(x)$, where y is the image grayscale value, x is the light energy, $f(x)$ is an increasing function, $x=dz$, z is light transmittance, and d is a to-be-determined parameter. Optionally, the light energy is determined based on light energy density, aperture value, the light transmittance, and shutter speed, and the to-be-determined d is a parameter determined based on the light energy density, the aperture value, and the shutter speed.

(2) The processor calculates an inverse function of the function $f(x)$ to obtain a function relationship $dz=f^{-1}(y)$ between the light transmittance and the image grayscale value.

(3) The processor determines the to-be-determined parameter d in the function relationship between the light transmittance and the image grayscale based on the grayscale value of each pixel in the region on the second image and the region corresponds to the highlight region.

The following describes in detail a manner in which the processor predetermines the association relationship between an optical power reaching the photosensitive sensor and the image grayscale value. For ease of description, first, various parameters are defined as follows.

A. Coordinates of a pixel in an image captured by the processor are represented as $(x, y)$, and a grayscale value of $(x, y)$ is represented as $Y(x,y)$.

B. A pixel on the liquid crystal panel is represented as $(p, q)$, light transmittance at $(p, q)$ is represented as $T(p,q)$, and the pixel $(p, q)$ on the liquid crystal panel may be mapped to the image captured by a sensor through conversion using a perspective matrix.

C. A focal length of the video recording apparatus is a fixed value.

In a manner of determining the association relationship between the optical power reaching the photosensitive sensor and the image grayscale value, an aperture value of a video camera is represented as A. The aperture value, that is, a relative aperture, equals to F/D, where F is the focal length, and D is a diameter of the aperture.

It is assumed that a light energy density of a light ray, which is emitted by a point light source, reaching the lens assembly is represented as P(p,q). The light energy density is related only to brightness of the point light source and distance between the lens assembly and the point light source. In this solution, loss of light during transmission in air medium inside the lens assembly is ignored. Provided that the light energy density is constant, the optical power passing through the aperture is directly proportional to the area of the aperture, and the area of the aperture is directly proportional to the square of the diameter of the aperture. Because the aperture value is defined as F/D, the optical power passing through the aperture is inversely proportional to the square of the aperture value. It is assumed that a product of the optical power passing through the aperture and the square of the aperture value is a constant c. In addition, the light transmittance of the liquid crystal panel may be understood as a ratio of light passing through the liquid crystal panel, and has a value range of [Tmin, Tmax], where 0≤Tmin≤Tmax≤1. Therefore, the light energy density finally reaching the photosensitive sensor is $P(p,q)*c/A^2*T(p,q)$.

Further, in a photosensitive sensor, an area of each pixel is fixed. The area is a constant, represented as a. In an exposure time period t, light energy received by a pixel is $P(p,q)*c/A^2*T(p,q)*a*t$.

It is assumed that an association relationship between light energy reaching the photosensitive sensor and a grayscale of an image finally formed on the photosensitive sensor is represented using a function f, and G is used to represent a total gain.

$$f(P(p,q)*c/A^2*T(p,q)*a*t)*G=Y(p,q).$$  Formula 1:

In formula 1, the exposure time period may be determined by the processor. A gain is an amplification coefficient of an image signal. G in formula 1 is the total gain, that is, G is a product of a digital gain and an analog gain. Both the digital gain and the analog gain may be determined by the processor.

In formula 1, the grayscale value of the image formed on the photosensitive sensor is in positive correlation to the light energy reaching the photosensitive sensor. The relationship may be represented using a monotonic increasing function f shown in FIG. 5. Because components of the video recording apparatus are non-linear, a light energy-grayscale value relationship curve shown in FIG. 5 is a non-linear monotonic increasing curve.

Figure 5:
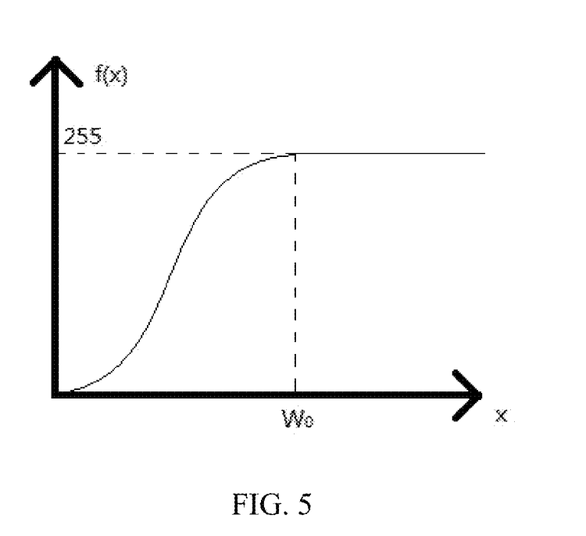
FIG. 5 is a light energy-grayscale value relationship curve of a video recording apparatus.

The light energy-grayscale value relationship curve shown in FIG. 5 is a characteristic curve of the photosensitive sensor, and is related only to a particular photosensitive sensor. When the photosensitive sensor in the video recording apparatus is fixed, the curve shown in FIG. 5 is also fixed. Therefore, the curve shown in FIG. 5 may be obtained through actual measurement.

A manner of obtaining the curve of "f" through actual measurement may be first setting an aperture of the video recording apparatus to a maximum (for example, 1.2), setting a shutter speed to ⅕₀ second (s), setting the gain to 1.0, setting light transmittance to a maximum (for example, 0.9), and adjusting a light source power from small to large. When a grayscale value of a pixel that is captured from the photosensitive sensor and that corresponds to the point light source reaches exactly 255, light energy reaching the photosensitive sensor is represented as $W_0$, that is, $f(W_0)=255$. Then, only the shutter speed, the aperture value, and the light transmittance are adjusted while keeping other conditions unchanged, to obtain values of a plurality of sampling points at which light energy equivalently reaches the photosensitive sensor falls within a range of 0 to $W_0$. In this implementation, the light energy-grayscale value relationship curve shown in FIG. 5 is fitted by repeatedly measuring a plurality of measurement points.

When the video recording apparatus shown in FIG. 2 and FIG. 3 performs the method for suppressing highlight blooming according to the embodiments of the present disclosure, the light energy-grayscale value relationship curve shown in FIG. 5 is obtained.

In the method of this embodiment of the present disclosure, when the processor already determines a highlight region and sets light transmittance of each pixel in the adjustment region on the liquid crystal panel to the second value, for example, the lowest light transmittance to which the liquid crystal panel can be adjusted, the processor captures a second image from the photosensitive sensor, and a grayscale value of a pixel (p, q) in a region on the second image and the region corresponds to the highlight region is Y(p,q). In this case, the gain is G, the light transmittance is T(p,q), the shutter value is t, the aperture value is A, and light energy density reaching the lens assembly is represented as P. Therefore, $f(P(p,q)*c/A^2*T(p,q)*a*t)*G=Y(p,q)$.

That is, formula 2 is obtained as $P(p,q)*c/A^2*T(p,q)*a*t=f^{-1}(Y(p,q)/G)$.

Because f is a monotonic increasing function, f has an inverse function. In addition, because the processor already obtains the curve of "f" shown in FIG. 5 in advance, the processor may obtain an inverse function $f^{-1}$ of the function f based on the curve of "f".

In a process of preventing blooming, a grayscale to which each pixel in the highlight region is expected to reach is set to a specified value, such as 240. Therefore, $f(P(p,q)*c/A^2*T'(p,q)*a*t)*G=240$.

That is, formula 3 is obtained as $P(p,q)*c/A^2*T'(p,q)*a*t=f^{-1}(240/G)$.

A result of dividing formula 3 by formula 2 is:

$$T'(p,q)/T(p,q)=f^{-1}(240/G)/f^{-1}(Y(p,q)/G).$$

Therefore, $T'(p,q)=g*T(p,q)$, where $g=f^{-1}(240/G)/f^{-1}(Y(p,q)/G)$.

That is, when the light transmittance changes from T(p,q) to g*T(p,q), after light energy reaching the photosensitive sensor obtains a gain, a grayscale value of approximately 240 is obtained, thereby suppressing blooming.

Because light transmittance of a liquid crystal screen falls within a range of [Tmin, Tmax], for a finally calculated value of T'(p,q), there may be three possible results as follows.

$T'(p,q) \in (0, T\text{min});$ $T'(p,q) \in [T\text{min}, T\text{max}];$ or $T'(p,q) \in (T\text{max}, +\infty).$ Physical meanings of the three cases are as follows.

T'(p,q)∈(0,Tmin): It indicates that for this pixel, the light transmittance of the liquid crystal panel needs to be decreased to lower than Tmin. Because this is beyond a light shielding capability of the liquid crystal screen, a problem in such a scenario cannot be resolved using this solution. However, this type of highlight source is relatively rare during actual application, and therefore this case can be ignored.

T'(p,q)∈[Tmin, Tmax]: It indicates that for this pixel, the light transmittance of the liquid crystal panel needs to be decreased to a value in a range of [Tmin, Tmax], and exactly corresponds to a range of a light transmittance adjustment capability of the liquid crystal screen. If light transmittance of a corresponding point on the liquid crystal screen is set to the light transmittance, a grayscale value should be lower than or equal to 255. This is a typical characteristic of a directly illuminated point.

$T'(p,q) \in (T_{max}, +\infty)$: For this pixel, light transmittance to which light transmittance of this pixel is expected to be decreased is greater than corresponding maximum light transmittance Tmax of the liquid crystal screen, and even greater than 1. That the light transmittance is greater than 1 actually means that optical power is amplified. That is, the grayscale value can reach 255 only after the optical power of the point is amplified. Therefore, an original brightness of the point cannot enable the grayscale value to reach 255. Considering that the point is identified as a point in the highlight region at first, and this point is a typical highlight blooming point. For such a point, even if light transmittance of a corresponding region is adjusted as much as possible, a grayscale value cannot be caused to saturation.

It can be learned from the foregoing that, the illumination processing method in this embodiment of the present disclosure includes only steps of determining a highlight region, adiactinic processing, recalculating light transmittance of each point in the highlight region, and turning down light transmittance of a corresponding pixel on a liquid crystal panel, and therefore processing is highly efficient. In addition, in this method, blooming is prevented from a perspective of optics based on the source of generation of highlight interference, thereby improving effectiveness of information captured by the photosensitive sensor.

The method in this embodiment of the present disclosure is not only applicable to a scenario in which a to-be-photographed object is static, but also applicable to a scenario in which a to-be-photographed object moves. In a scenario in which a to-be-photographed object moves, the processor implements synchronous movement control on a corresponding pixel on the liquid crystal panel by tracking and predicting a movement trajectory of the to-be-photographed object, to track and shield a highlight region.

Further, the processor predicts a predicted highlight region on a subsequent image after a first image which a highlight region is on, and before capturing the subsequent image which the predicted highlight region is on from the photosensitive sensor, the processor decreases light transmittance of each pixel in an adjustment region on the liquid crystal panel and the adjustment region corresponds to the predicted highlight region.

The processor determines, in a plurality of manners such as a light flow method and a frame difference method, the predicted highlight region on the subsequent image based on the highlight region on the first image.

Figure 6:
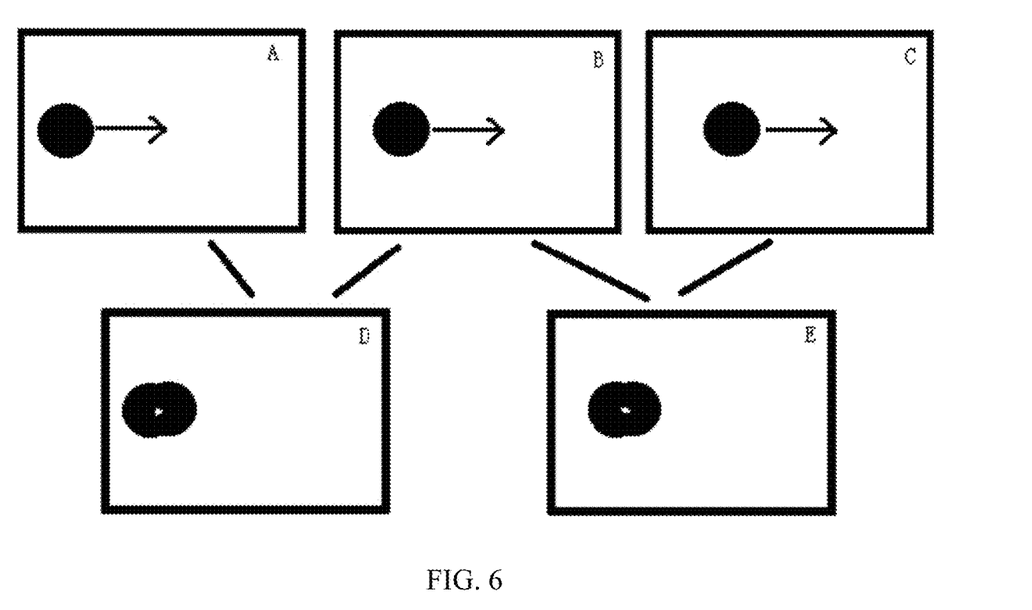
FIG. 6 is a schematic diagram of a method for predicting a position of a highlight region by a processor using frame difference method.

FIG. 6 is a schematic diagram of a method for predicting the position of a highlight region by a processor using frame difference method. As shown in FIG. 6, it is assumed that three frames of images A, B, and C describe a scenario in which a to-be-photographed object moves from left to right, and black regions represent foreground pixels. A frame difference image of A and B is shown by an image D in which a white point is a pixel center of gravity, marked with a first pixel center of gravity. A frame difference image of B and C is shown by an image E in which white point is a pixel center of gravity, marked with a second pixel center of gravity.

Figure 7:
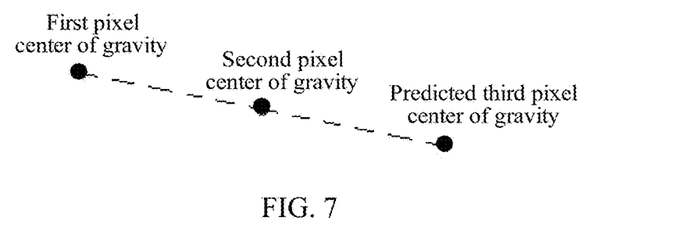
FIG. 7 is a schematic diagram of predicting the position of the center of gravity of frame difference image of a next frame according to coordinates of centers of gravity in FIG. 6.

In a simple uniform rectilinear motion model, a position of a center of gravity of frame difference image of the next frame may be predicted using coordinates of the pixel centers of gravity of the images D and E. FIG. 7 is a schematic diagram of predicting a position of a center of gravity of frame difference image of the next frame based on coordinates of centers of gravity in FIG. 6. As shown in FIG. 7, provided that a coordinate of the first pixel center of gravity and a coordinate of the second pixel center of gravity are known, a predicted position of a third pixel center of gravity should be a position at a distance from the second pixel center of gravity in a direction from the first pixel center of gravity to the second pixel center of gravity. The distance between the predicted third pixel center of gravity and the second pixel center of gravity should approximately equal to a distance between the first pixel center of gravity and the second pixel center of gravity.

In a process of tracking motion of the to-be-photographed object, a preferred manner is performing motion estimation using Kalman filtering such that a position of highlight region of the next frame (not limited to uniform rectilinear motion) can be predicted, and shielding can be performed in advance. For a scenario in which there is no emergent stop and start, Kalman filtering can provide a desirable prediction result. In OpenCV, a standard implementation of Kalman filtering is provided. Optionally, motion estimation may be performed using two functions, cvCreateKalman and cvKalmanPredict. A core idea of the method is predicting a coordinate of a target at a next moment using a coordinate of the target at a current moment, and correcting a prediction model using an actual coordinate of the target when the next moment actually arrives. Because this process is a standard algorithm that has been disclosed, a filtering process is briefly described as follows.

(1) Obtaining a first coordinate as an initial condition, and using a second actual coordinate as a predicted coordinate;

(2) Setting the second actual coordinate as an actual value to correct the model, and then predicting a third coordinate;

(3) Setting a third actual coordinate as an actual value to correct the model, and then predicting a fourth coordinate; and (4) Repeating the foregoing operations, to continuously obtain predicted coordinates and use actual coordinates to correct the prediction model.

Figure 8:
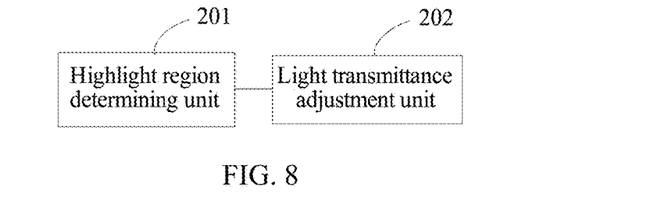
FIG. 8 is a schematic structural diagram of an illumination processing apparatus according to an embodiment of the present disclosure.

FIG. 8 is a schematic structural diagram of an illumination processing apparatus according to an embodiment of the present disclosure. The apparatus is used as a processor and is connected to a liquid crystal panel having adjustable light transmittance. The liquid crystal panel is disposed between a lens assembly and a photosensitive sensor. An incident light from the lens assembly reaches the photosensitive sensor after passing through the liquid crystal panel. As shown in FIG. 8, the apparatus includes a highlight region determining unit 201 and a light transmittance adjustment unit 202.

The highlight region determining unit 201 is configured to determine a highlight region on a first image captured from the photosensitive sensor.

The light transmittance adjustment unit 202 is configured to decrease light transmittance of each pixel in an adjustment region on the liquid crystal panel and the adjustment region corresponds to the highlight region.

Optionally, the light transmittance adjustment unit 202 is further configured to perform the following steps before the highlight region determining unit 201 determines the highlight region on the first image captured from the photosensitive sensor, setting light transmittance of each pixel on the liquid crystal panel to be a first value, where the first value falls within [A, B], A is a preset high threshold, and B is highest light transmittance of the liquid crystal panel, and capturing the first image from the photosensitive sensor.

Optionally, that the highlight region determining unit 201 determines a highlight region on a first image captured from the photosensitive sensor includes determining the highlight region on the first image based on a grayscale value of each pixel in the first image.

Optionally, the first value is the highest light transmittance of the liquid crystal panel.

Optionally, that the light transmittance adjustment unit 202 decreases light transmittance of each pixel in an adjustment region on the liquid crystal panel and the adjustment region corresponds to the highlight region includes setting the light transmittance of each pixel in the adjustment region on the liquid crystal panel to be a second value, where the second value falls within [C, D], C is lowest light transmittance of the liquid crystal panel, and D is a preset low threshold, capturing a second image from the photosensitive sensor, determining, based on a grayscale value of each pixel in a region on the second image and the region corresponds to the highlight region, target light transmittance which the light transmittance of each pixel in the adjustment region on the liquid crystal panel is to be adjusted to, and adjusting the light transmittance of each pixel in the adjustment region on the liquid crystal panel to the determined corresponding target light transmittance.

Optionally, the second value is the lowest light transmittance of the liquid crystal panel.

Optionally, that light transmittance adjustment unit 202 determines, based on a grayscale value of each pixel in a region on the second image and the region corresponds to the highlight region, target light transmittance which the light transmittance of each pixel in the adjustment region on the liquid crystal panel is to be adjusted to includes determining a relationship between light transmittance and an image grayscale value based on the grayscale value of each pixel in the region on the second image and the region corresponds to the highlight region, and determining, based on the relationship between the light transmittance and the image grayscale value, the target light transmittance of each pixel in the adjustment region on the liquid crystal panel when the grayscale value of each pixel in a region on an image captured from the photosensitive sensor and the region corresponds to the highlight region reaches a preset expected grayscale value.

Optionally, that the light transmittance adjustment unit 202 determines a relationship between light transmittance and an image grayscale value based on the grayscale value of each pixel in the region on the second image and the region corresponds to the highlight region further includes and is configured to perform predetermining an association relationship between light energy reaching the photosensitive sensor and an image grayscale value, wherein the association relationship satisfies a formula $y=f(x)$, y is the image grayscale value, x is the light energy, $f(x)$ is an increasing function, $x=dz$, z is light transmittance, and d is a to-be-determined parameter, calculating an inverse function of the function $f(x)$, to obtain a function relationship $dz=f^{-1}(y)$ between the light transmittance and the image grayscale value, and determining the to-be-determined parameter d in the function relationship between the light transmittance and the image grayscale based on the grayscale value of each pixel in the region on the second image, wherein the region corresponds to the highlight region.

Optionally, the highlight region determining unit 201 is further configured to predict a predicted highlight region on a subsequent image after the first image, wherein the predicted highlight region corresponds to the highlight region.

The light transmittance adjustment unit 202 is further configured to decrease light transmittance of each pixel in a region on the liquid crystal panel and the region corresponds to the predicted highlight region before the subsequent image corresponding to the predicted highlight region is captured from the photosensitive sensor.

In another embodiment of the present disclosure, implemented in a hardware, the highlight region determining unit 201 and the light transmittance adjustment unit 202 may be combined into one functional module. The functional module may be built in or independent of a processor of a video recording apparatus in a hardware form, or may be stored in a memory of the video recording apparatus in a software form so that the processor can invoke the functional module to perform corresponding operations of the foregoing modules.

According to the illumination processing apparatus in this embodiment of the present disclosure, occurrence of a highlight blooming phenomenon can be avoided as much as possible, thereby avoiding loss of valid image information.

It may be understood that, the processor used in the video recording apparatus in the embodiments of the present disclosure may be a Central Processing Unit (CPU), a general-purpose processor, a Digital Signal Processor (DSP), an Application-Specific Integrated Circuit (ASIC), a Field Programmable Gate Array (FPGA) or another programmable logic device, a transistor logic device, a hardware component, or any combination thereof. The processor can implement or perform various examples of logic blocks, modules, and circuits described with reference to content disclosed in the present disclosure. The processor may also be a combination for implementing a computing function, for example, including one or more microprocessor combinations, or a combination of a DSP and a microprocessor.

A person skilled in the art may clearly understand that, descriptions of the embodiments provided by the present disclosure may be reference for each other. For ease and brevity of description, for example, for functions of the apparatuses and devices and performed steps that are provided in the embodiments of the present disclosure, refer to related descriptions in the method embodiments of the present disclosure.

The methods or algorithm steps described with reference to the content disclosed in the present disclosure may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable ROM (EPROM), an electrically EPROM (EEPROM) memory, a register, a hard disk, a removable hard disk, a compact disc ROM (CD-ROM), or a storage medium in any other forms well-known in the art. A storage medium used as an example is coupled to the processor such that the processor can read information from the storage medium, and can write information into the storage medium. Certainly, alternatively, the storage medium may be a part of the processor. The processor and the storage medium may be located in an ASIC. In addition, the ASIC may be located in the user equipment. Certainly, the processor and the storage medium may alternatively exist in the video recording apparatus as discrete components.

In addition, the system, device and method described herein, and schematic diagrams of different embodiments can be combined or integrated with other systems, modules, technologies, or methods without departing from the scope of this application. In addition, the displayed or discussed mutual couplings or direct couplings or communication connections may be implemented through some interfaces, indirect couplings or communication connections between the apparatuses or units, or electrical connections, mechanical connections, or connections in other forms.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An illumination processing method, comprising:
    disposing a liquid crystal panel having adjustable light transmittance between a photosensitive sensor and a lens assembly, an incident light from the lens assembly reaching the photosensitive sensor after passing through the liquid crystal panel;
    determining a highlight region on a first image captured from the photosensitive sensor; and
    turning down light transmittance of each pixel in an adjustment region corresponding to the highlight region on the liquid crystal panel,
    wherein turning down the light transmittance of each pixel in the adjustment region on the liquid crystal panel comprises:
    decreasing the light transmittance of each pixel in the adjustment region on the liquid crystal panel;
    capturing a second image from the photosensitive sensor;
    determining, based on a grayscale value of each pixel in a region on the second image, target light transmittance which the light transmittance of each pixel in the adjustment region on the liquid crystal panel is to be adjusted to, the region on the second image corresponding to the highlight region; and
    adjusting the light transmittance of each pixel in the adjustment region on the liquid crystal panel to the determined corresponding target light transmittance.

2. The method of claim 1, wherein before determining the highlight region on the first image captured from the photosensitive sensor, the method further comprises:
    setting light transmittance of each pixel on the liquid crystal panel to be a first value, the first value falling within [A, B], A comprising a preset high threshold, and B comprising a highest light transmittance of the liquid crystal panel; and
    capturing the first image from the photosensitive sensor.

3. The method of claim 1, wherein determining the highlight region on the first image captured from the photosensitive sensor comprises determining the highlight region on the first image based on a grayscale value of each pixel in the first image.

4. The method of claim 2, wherein the first value comprises the highest light transmittance of the liquid crystal panel.

5. The method of claim 1, wherein the turning down the light transmittance of each pixel in the adjustment region on the liquid crystal panel further comprises:
    setting the light transmittance of each pixel in the adjustment region on the liquid crystal panel to be a second value, the second value falling within [C, D], C comprising a lowest light transmittance of the liquid crystal panel, and D comprising a preset low threshold.

6. The method of claim 5, wherein the second value comprises the lowest light transmittance of the liquid crystal panel.

7. The method of claim 5, wherein determining the target light transmittance which the light transmittance of each pixel in the adjustment region on the liquid crystal panel is to be adjusted to comprises:
    determining a relationship between light transmittance and image grayscale value based on the grayscale value of each pixel in the region on the second image, the region on the second image corresponding to the highlight region; and
    determining, based on the relationship between the light transmittance and the image grayscale value, the target light transmittance of each pixel in the adjustment region on the liquid crystal panel when a grayscale value of each pixel in a region on an image captured from the photosensitive sensor reaches a preset expected grayscale value, the region on the image corresponding to the highlight region.

8. The method of claim 7, wherein determining the relationship between the light transmittance and the image grayscale value comprises:
    predetermining an association relationship between light energy reaching the photosensitive sensor and the image grayscale value, the association relationship satisfying a formula $y=f(x)$, y comprising the image grayscale value, x comprising the light energy, $f(x)$ comprising an increasing function, $x=dz$, z comprising the light transmittance, and d comprising a to-be-determined parameter;
    calculating an inverse function of the $f(x)$ to obtain a function relationship $dz=f^{-1}(y)$ between the light transmittance and the image grayscale value; and
    determining the d in the function relationship between the light transmittance and the image grayscale based on the grayscale value of each pixel in the region on the second image, the region on the second image corresponding to the highlight region.

9. The method of claim 1, further comprising:
    predicting a predicted highlight region on a subsequent image after the first image, the predicted highlight region corresponding to the highlight region; and
    turning down light transmittance of each pixel in a region corresponding to the predicted highlight region on the liquid crystal panel before the subsequent image corresponding to the predicted highlight region is captured from the photosensitive sensor.

10. An illumination processing apparatus, coupled to a liquid crystal panel having adjustable light transmittance, comprising:
    a computer-readable storage medium configured to store programming instructions; and
    a processor coupled to the computer-readable storage medium, the programming instructions causing the processor to be configured to:
    determine a highlight region on a first image captured from a photosensitive sensor, the liquid crystal panel being disposed between a lens assembly and the photosensitive sensor, an incident light from the lens assembly reaching the photosensitive sensor after passing through the liquid crystal panel; and
    decrease light transmittance of each pixel in an adjustment region on the liquid crystal panel, the adjustment region corresponding to the highlight region, wherein in a manner of decreasing the light transmittance of each pixel in the adjustment region on the liquid crystal panel, the programming instructions further cause the processor to be configured to:
  decrease the light transmittance of each pixel in the adjustment region on the liquid crystal panel;
  capture a second image from the photosensitive sensor;
  determine, based on a grayscale value of each pixel in a region on the second image, target light transmittance which the light transmittance of each pixel in the adjustment region on the liquid crystal panel is to be adjusted to, the region on the second image corresponding to the highlight region; and
    adjust the light transmittance of each pixel in the adjustment region on the liquid crystal panel to the determined corresponding target light transmittance.

11. The apparatus of claim 10, wherein before determining the highlight region on the first image captured from the photosensitive sensor, the programming instructions further cause the processor to be configured to:
  set light transmittance of each pixel on the liquid crystal panel to be a first value, the first value falling within [A, B], A comprising a preset high threshold, and B comprising a highest light transmittance of the liquid crystal panel; and
  capture the first image from the photosensitive sensor.

12. The apparatus of claim 10, wherein in a manner of determining the highlight region on the first image captured from the photosensitive sensor, the programming instructions further cause the processor to be configured to determine the highlight region on the first image based on a grayscale value of each pixel in the first image.

13. The apparatus of claim 11, wherein the first value comprises the highest light transmittance of the liquid crystal panel.

14. The apparatus of claim 10, wherein in the manner of decreasing the light transmittance of each pixel in the adjustment region on the liquid crystal panel, the programming instructions further cause the processor to be configured to:
  set the light transmittance of each pixel in the adjustment region on the liquid crystal panel to be a second value, the second value falling within [C, D], C comprising a lowest light transmittance of the liquid crystal panel, and D comprising a preset low threshold.

15. The apparatus of claim 14, wherein the second value comprises the lowest light transmittance of the liquid crystal panel.

16. The apparatus of claim 14, wherein in a manner of determining the target light transmittance which the light transmittance of each pixel in the adjustment region on the liquid crystal panel is to be adjusted to, the programming instructions further cause the processor to be configured to:
  determine a relationship between light transmittance and an image grayscale value based on the grayscale value of each pixel in the region on the second image, the region on the second image corresponding to the highlight region; and
  determine, based on the relationship between the light transmittance and the image grayscale value, the target light transmittance of each pixel in the adjustment region on the liquid crystal panel when a grayscale value of each pixel in a region on an image captured from the photosensitive sensor reaches a preset expected grayscale value, the region on the image corresponding to the highlight region.

17. The apparatus of claim 16, wherein in a manner of determining the relationship between the light transmittance and the image grayscale value, the programming instructions further cause the processor to be configured to:
  predetermine an association relationship between light energy reaching the photosensitive sensor and the image grayscale value, the association relationship satisfying a formula $y=f(x)$, y comprising the image grayscale value, x comprising the light energy, $f(x)$ comprising an increasing function, $x=dz$, z comprising the light transmittance, and d comprising a to-be-determined parameter;
  calculate an inverse function of the $f(x)$ to obtain a function relationship $dz=f^{-1}(y)$ between the light transmittance and the image grayscale value; and
  determine the d in the function relationship between the light transmittance and the image grayscale based on the grayscale value of each pixel in the region on the second image, the region on the second image corresponding to the highlight region.

18. The apparatus of claim 10, wherein the programming instructions further cause the processor to be configured to:
  predict a predicted highlight region on a subsequent image after the first image, the predicted highlight region corresponding to the highlight region; and
  decrease light transmittance of each pixel in a region corresponding to the predicted highlight region on the liquid crystal panel before the subsequent image corresponding to the predicted highlight region is captured from the photosensitive sensor.

* * * * *